UNITED STATES PATENT OFFICE.

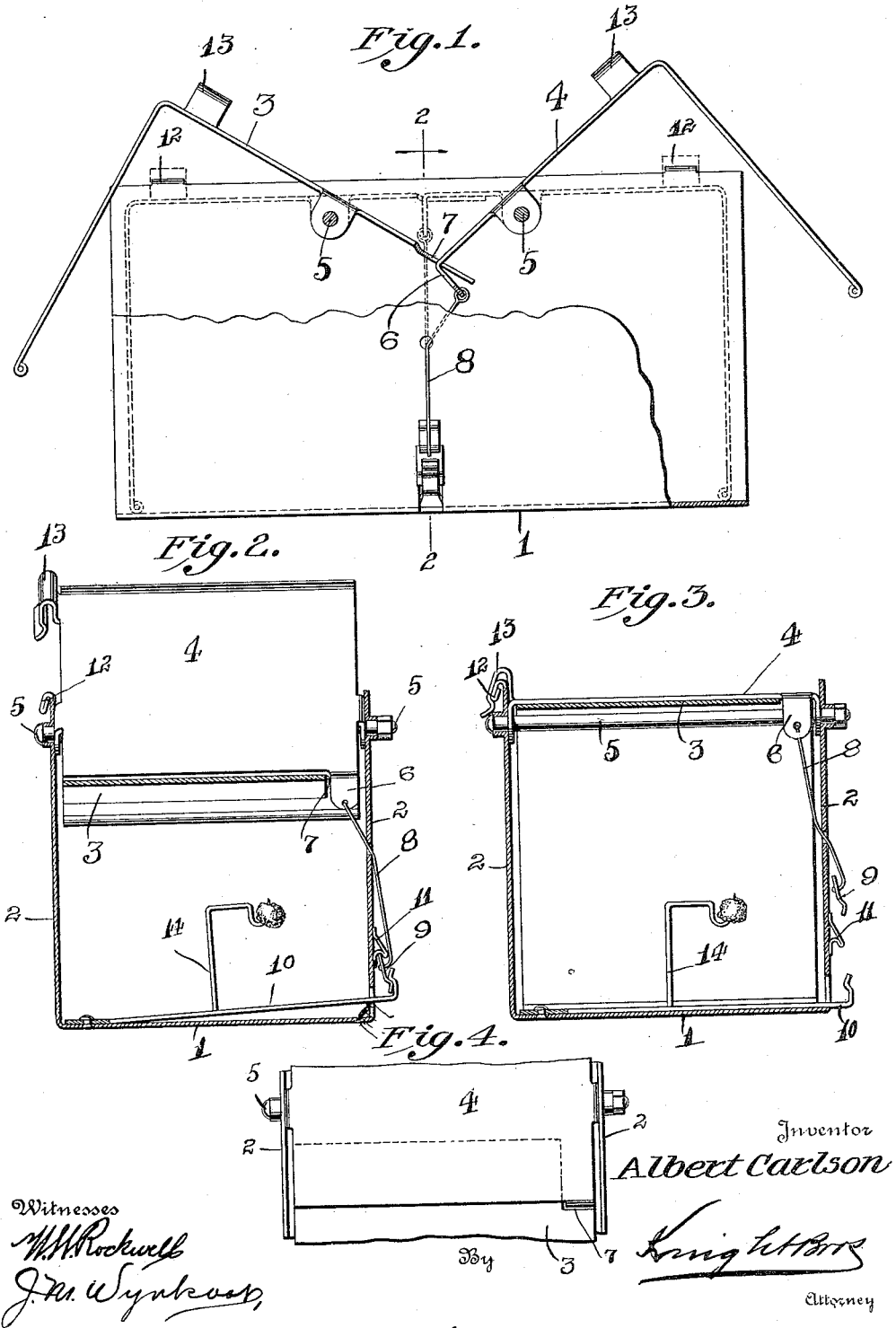

ALBERT CARLSON, OF WALCOTT, NORTH DAKOTA.

CAGE ANIMAL-TRAP.

1,130,667.  Specification of Letters Patent.  Patented Mar. 2, 1915.

Application filed May 26, 1914.  Serial No. 841,137.

*To all whom it may concern:*

Be it known that I, ALBERT CARLSON, a citizen of the United States, residing at Walcott, in the county of Richland and State of North Dakota, have invented certain new and useful Improvements in Cage Animal-Traps, of which the following is a specification.

This invention relates to a cage trap for rodents and other animals.

The primary object of the invention is to provide a trap which will be not only cheap and simple of construction, but cheap and simple in the manner of assembling.

Another object of the invention is to construct a trap as above mentioned, eliminating all of the usual outside projecting parts, whereby the trap may be packed for shipment without disarrangement.

To these ends the invention resides in a trap constructed mainly of three parts, one of said parts constituting the bottom, and side walls, and the others of said parts constituting the doors, which provide not only the closures for the two ends, but together constitute the entire top closure.

In the accompanying drawings:—Figure 1 is a side elevation of the trap with a portion shown in section. Fig. 2 is a cross sectional view of the same on the line 2—2. Fig. 3 is a view similar to Fig. 2 with the door in closed position. Fig. 4 is a top view of the trap showing the relation of the underlapping portion of the doors in detail.

Referring to the drawing in detail, 1 and 2 represent the bottom and side walls of the trap which may be constructed of any suitable material, preferably metal. These side walls and the bottom of the trap are preferably rigidly related to each other and made of a single piece of metal.

3 and 4 represent a pair of doors, which will be hereinafter termed the controlled door (3) and the controlling door (4). These doors are constructed to have hinged connection near their meeting ends, with the two side walls 2 of the trap, through means of the transverse pintles 5, preferably extending through the side walls, and tying them together and in proper relation to the doors. Each of the doors 3 and 4 forms a movable end wall to the trap and together they form the entire top portion. The controlled door 3 is adapted to underlap the controlling door 4 between the pintles 5 and establish interengaging relation between the doors. By means of the downwardly projecting lug 6, of the controlling door, which works in the cut away portion 7 of the controlled door, the doors may be raised to set position by a cable 8 having one of its ends connected to the lug 6 and its other end passing through the side wall of the trap and connected to a prop 9. The prop 9 is adapted to set the trap and hold the doors open by engagement with a trigger 10 and a projection 11 on the side wall of the trap. A spring catch comprising a swelled projection 12 and a resilient embracing clip 13 is provided to retain the doors in closed position when the trap has been sprung.

14 designates a bait holder which may be mounted or attached to the trigger 10.

I claim:—

1. A cage animal-trap comprising rigidly related bottom and side walls, a pair of doors having hinging connection with the side walls of the cage, and trigger mechanism adapted to hold the doors open; each of said doors forming a movable end wall to the cage, and said doors together forming the entire top wall of the cage; said doors meeting on an intermediate transverse line of the top, and their hinging connections comprising transverse pintles near their meeting line; the top-forming portions of the doors having interengaging projections meeting between their pintles, whereby one door becomes a controlling door and the other a controlled door adapted to be held open by said controlling door.

2. A cage animal-trap comprising rigidly related bottom and side walls, a pair of doors having hinging connection with the side walls of the cage, and trigger mechanism adapted to hold the doors open, each of said doors forming a movable end wall to the cage, and said doors together forming the entire top wall of the cage; said doors meeting on an intermediate transverse line of the top, and their hinging connections comprising transverse pintles near their meeting line, the top-forming portions of the doors having interengaging projections meeting between their pintles, one door having an extension which underlaps and slides upon the edge of the other door, whereby one door becomes a controlling door and the other a controlled door adapted to be held open by said controlling door; the trigger mechanism being connected with the controlling door, and the controlled door being adapted to open independently of the controlling door for emptying the trap.

The foregoing specification signed at Walcott, N. D. this 5th day of May, 1914.

ALBERT CARLSON.

In presence of two witnesses:
P. J. DAHLEN,
RICHARD N. LEE.

Copies of this patent may be obtained for five cents each, by addressing the "Commissioner of Patents, Washington, D. C."